United States Patent [19]

Hansen et al.

[11] Patent Number: 4,881,602
[45] Date of Patent: Nov. 21, 1989

[54] TURF AERATING TINE

[75] Inventors: Loren F. Hansen; Mark L. Cozine, both of Lincoln, Nebr.

[73] Assignee: Outboard Marine Corporation, Waukegan, Ill.

[21] Appl. No.: 228,984

[22] Filed: Aug. 5, 1988

[51] Int. Cl.⁴ ............................................. A01B 45/02
[52] U.S. Cl. ..................................... 172/22; 294/50.7
[58] Field of Search ........................ 172/21, 22, 713; 294/50.7, 50.6; 111/7.1, 7.2, 7.3, 7, 89, 90, 91, 99

[56] References Cited

U.S. PATENT DOCUMENTS

| Re. 30,705 | 8/1981 | Hines | 172/22 |
|---|---|---|---|
| 583,301 | 5/1897 | Eckel | 30/130 |
| 863,621 | 8/1907 | Medbury | 30/130 |
| 958,875 | 5/1910 | Ibson | 30/316 |
| 1,371,948 | 3/1921 | Szutz | 30/316 |
| 1,572,431 | 2/1926 | Hansen | 294/50.7 |
| 2,027,546 | 1/1936 | MacDonald | 94/19.2 |
| 2,263,531 | 11/1941 | Kevorkian | 30/316 |
| 2,612,725 | 9/1952 | Casey | 172/22 X |
| 2,686,690 | 8/1954 | Kushnir | 294/50.7 |
| 2,800,066 | 7/1957 | Cohrs | 172/22 |
| 3,011,563 | 12/1961 | Ceretti | 294/50.7 |
| 3,098,672 | 7/1963 | Husband | 294/50.7 |
| 3,206,067 | 9/1965 | Smith, Jr. et al. | 294/19.2 |
| 3,834,464 | 9/1974 | Carlson et al. | 172/22 |
| 4,662,456 | 5/1987 | Classen | 172/22 |

FOREIGN PATENT DOCUMENTS 309727  4/1929  United Kingdom ............... 294/50.7

Primary Examiner—Richard J. Johnson
Attorney, Agent, or Firm—Welsh & Katz, Ltd.

[57] ABSTRACT

A coring tine for use in a turf aerator and the like has an elongated generally tubular body having a core discharge end and a turf penetrating end. The turf penetrating end has a core gripping configuration which, in various embodiments, may take the form of an obround, longitudinal flutes, a generally frusto-conical wall having radially inwardly formed core retaining fingers, or a narrowed neck adapted to improve frictional engagement with a turf core and retain the core within the tine during retraction from a turf surface.

4 Claims, 1 Drawing Sheet

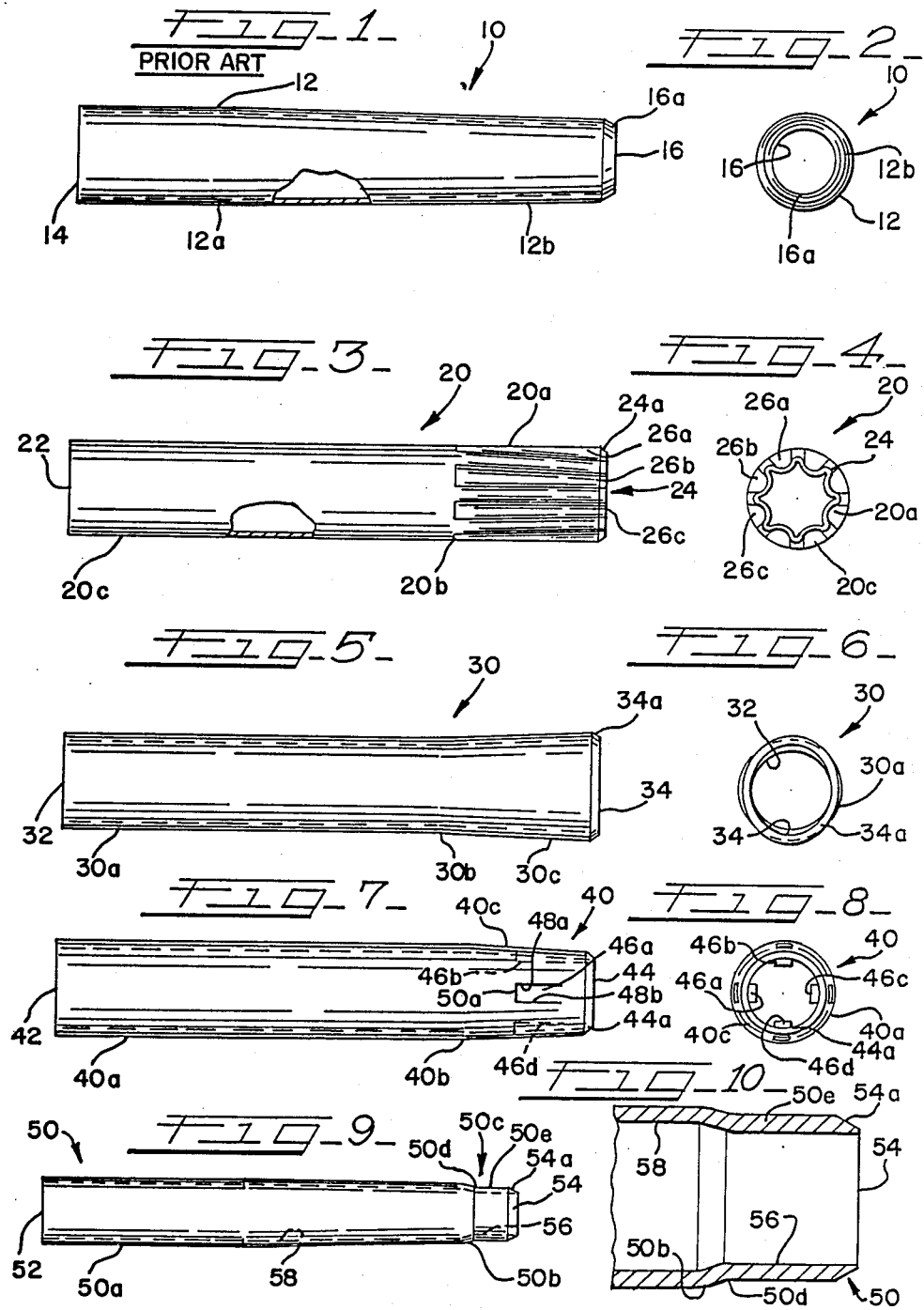

TURF AERATING TINE

BACKGROUND OF THE INVENTION

The present invention relates generally to aerating tines for use in aerating turf and soil surfaces, and more particularly to a novel aerating tine having improved turf core retention characteristics which assure retention of a turf core as the tine is retracted from the turf or soil during an aerating operation.

It is a common practice in the maintenance and care of turf surfaces, such as residential and commercial lawns and turf surfaces on golf courses and the like, to aerate the turf so as to enable nutrients to more readily hasten root growth, thereby resulting in a more durable and heartier looking turf. Such aeration of turf surfaces is commonly accomplished by aerating machines which employ a plurality of generally tubular tines supported either for rotation on a tine wheel, or for vertical reciprocating movement. In either mode, the tines are caused to undergo substantially longitudinal penetration into and retraction from the turf surface so as to form a pattern of generally cylindrical aeration holes in the turf as the aerating machine traverses the turf surface. Examples of rotary and vertically reciprocating type soil aerating machines are disclosed, respectively, in U.S. Pat. Nos. 4,081,034 and 3,834,464.

The tubular aeration tines employed in turf aerating machines of the aforementioned type are frequently formed with their soil penetrating ends swaged radially inwardly to a smaller diameter than their upper discharge ends. A significant drawback encountered with both straight cylindrical tubular tines and tines having inwardly swaged lower ends is that in certain soils insufficient friction is developed between the tine and a turf or soil core to retain the core within the tine as the tine is retracted from the turf surface. This problem is particularly prevalent in vertically reciprocating tine type aerators and frequently results in a portion or all of the turf core being left on the ground. This is particularly undesirable when the turf surface comprises a play surface such as a golf green or the like. It has been found that on golf courses, recent advances in cultural practices have made it more difficult to extract cores from the turf using conventional tines. A need thus exists for a tubular turf aerating tine which achieves sufficient friction between the tine and a turf or soil core to ensure retention of the core within the tine during retraction from the turf surface, while enabling the retained core to be readily pushed axially outwardly from the discharge end of the tine by a core formed during a subsequent turf penetration.

SUMMARY OF THE INVENTION

A general object of the present invention is to provide a novel tubular turf aerating tine having improved core retention properties over prior turf aerating tines.

A more particular object of the present invention is to provide a novel turf aerating tine having a tubular turf penetrating end formed to a predetermined configuration adapted to achieve greater core retaining friction between the tine and the soil core than has heretofore been achieved, thus ensuring complete removal of turf or soil cores from turf surfaces which otherwise present core pulling problems.

A feature of the aerating tine in accordance with the present invention lies in the provision of a turf penetrating end having improved core retention characteristics and which, in various embodiments, takes the form of a longitudinal fluted design, an obround transverse configuration, an inward taper having a plurality of inwardly formed core retaining fingers or a cylindrical gripping area formed by a slightly constricted neck.

Further objects and advantages of the invention will become apparent from the following detailed description of the invention when taken in conjunction with the accompanying drawing.

BRIEF DESCRIPTION OF THE DRAWING

FIG. 1 is a side elevational view of a turf aerating tine constructed in accordance with a known prior art design;

FIG. 2 is an end view of the turf penetrating end of the aerating tine of FIG. 1;

FIG. 3 is a side elevational view of a turf aerating tine constructed in accordance with one embodiment of the present invention;

FIG. 4 is an end view of the turf penetrating end of the tine of FIG. 3;

FIG. 5 is a side elevational view of a turf aerating tine constructed in accordance with another embodiment of the present invention;

FIG. 6 is an end view of the turf penetrating end of the tine of FIG. 5;

FIG. 7 is a side elevational view of a turf aerating tine in accordance with a further embodiment of the present invention;

FIG. 8 is an end view of the turf penetrating end of the aerating tine of FIG. 7;

FIG. 9 is a side elevational view of a turf aerating tine in accordance with an additional embodiment of the present invention; and FIG. 10 is a fragmentary vertical sectional view of the tine of FIG. 9.

DETAILED DESCRIPTION

Referring now to the drawing, and in particular to FIGS. 1 and 2, a turf aerating tine for use in a turf aerating machine and constructed in accordance with a prior known design is indicated generally at 10. The turf aerating tine 10 finds particular application with turf aerating machines having substantially vertically reciprocating tines such as disclosed in the aforementioned U.S. Pat. No. 3,834,464, but may be adapted for mounting on a rotary tine wheel of the type disclosed in the aforementioned U.S. Pat. No. 4,081,034, both of which are incorporated herein by reference. The turf aerating tine 10 has a tubular body 12 having a substantially circular transverse cross-sectional configuration as considered at substantially any point along its length. The aerating tine 10 may thus be formed from tubing stock, preferably a suitable strength metallic tubing, and defines a generally cylindrical tubular discharge end 14 and a turf penetrating end 16. The penetrating end 16 is preferably sharpened so as to form an annular chamfer 16a creating a sharpened turf penetrating edge.

The tubular body 12 of the aerating tine 10 is swaged progressively radially inwardly beginning from a point 12a approximately one-fourth the length of the tine from its discharge end 14, to its turf penetrating end 16 so as to form a generally uniformly tapered frusto-conical tine surface 12b along approximately three-fourths the length of the tine. While forming such a tapered turf penetrating end on a turf aerating tine has previously been considered as facilitating easier penetration into a turf surface, it has been found that such tapered aerating tines frequently fail to provide sufficient friction or gripping action to retain turf cores or plugs within the tines as they are retracted or withdrawn from the turf surface. This result has been particularly noticeable in some vertically reciprocating tine type aerating machines, and especially through the use of such machines on turf environments such as golf courses which benefit from advanced cultural practices.

In accordance with the present invention, various embodiments of tubular turf aerating tines are provided which have turf penetrating ends modified from conventional configurations so as to achieve greater friction between the internal tine surfaces and the turf cores, thereby resulting in more efficient core withdrawal and retention during a turf aerating operation. The turf aerating tines of the present invention find particular application in vertically reciprocating tine type turf aerating machines.

FIGS. 3 and 4 illustrate one embodiment of a turf aerating tine, indicated generally at 20, in accordance with the invention and which may be made from a suitable strength metallic tubular material defining a tubular body having a core discharge end 22 and a turf penetrating end designated generally by reference number 24. The turf penetrating end 24 is formed with a plurality of inwardly tapered longitudinally extending flutes, three of which are indicated at 26a, b and c, which are of equal circumferential flute width and equidistantly circumferentially spaced about the turf penetrating end 24. In the embodiment illustrated in FIGS. 3 and 4, the longitudinal flutes 26a,b,c etc., are formed of generally semi-circular concave transverse cross section and extend approximately one-fourth the length of the tine from the turf penetrating end 24 to a position 20b where the flutes initiate from a cylindrical tubular length 20c of the tine. The peripheral turf penetrating edge of tine 20 is preferably formed with a sharpened taper or chamfer 24a to facilitate penetration into the turf surface.

By forming the aerating tine 20 with a fluted turf penetrating end length 20a, the turf penetrating end 24 has increased internal friction surface area as compared to a generally cylindrical or frusto-conical shaped tubular aerating tine. The greater internal surface area of the turf penetrating end of tine 20 creates greater friction contact with a turf core so as to hold or retain the core within the tine with greater frictional force, thus ensuring complete withdrawal of the turf core from the turf surface as the tine is withdrawn following turf penetration. The longitudinal fluted design can be more readily formed than prior techniques which swage generally cylindrical tubing radially inwardly to form smaller diameter soil penetrating ends, thus resulting in lower production costs.

FIGS. 5 and 6 illustrate another embodiment of a turf aerating tine, indicated generally at 30, constructed in accordance with the present invention. The tine 30 is also preferably made of a suitable strength metallic tubular material so as to form a tubular body having a generally cylindrical tubular length 30a extending approximately two-thirds the length of the tine from an open discharge end 32 to a point or annular area 30b from which the tubular tine is formed into a turf penetrating end portion 30c terminating at a turf penetrating edge 34. The turf penetrating end portion 30c is of modified or irregular transverse cross-sectional configuration in the form of an obround which flares progressively outwardly from the diameter of the cylindrical length 30a along two generally diametrically opposite longitudinal surface elements, and is formed progressively inwardly from the diameter of the cylindrical length along two substantially diametrically opposed longitudinal surface elements offset approximately 90° to the outwardly flared surface elements. Preferably, a bevel or chamfer 34a is formed peripherally of the penetrating edge 34 to provide a sharpened turf penetrating edge.

The obround turf penetrating length 30c on the aerating tine 30 may be formed by progressively pressing diametrically opposed surfaces of the cylindrical tubular tine body generally radially inwardly toward the end edge 34 so as to alter the cylindrical tubular configuration into an obround configuration. As a result, the peripheral shape of a turf core formed during turf penetration of end 30c is altered as the core enters the penetrating end of the aerating tine due to the obround configuration, thus maintaining pressure between the tine wall and the turf core with resulting increased frictional forces acting to retain the core within the tine during retraction from the turf.

FIGS. 7 and 8 illustrate a further embodiment of a turf aerating tine, indicated generally at 40, constructed in accordance with the present invention. The turf aerating tine 40 is also preferably made from a suitable strength metallic tubular material and has a tubular length 40a of uniform cylindrical configuration extending from an open discharge end 42 to a point 40b from which the cylindrical tubular body progressively converges to establish a generally frusto-conical turf penetrating length 40c which terminates in a turf penetrating end 44. The end 44 is preferably formed with a sharpened circumferential chamfer or bevel surface 44a.

The turf aerating tine 40 has a plurality of generally longitudinally extending inwardly depressed or deformed notches formed in circumferentially spaced relation about its turf penetrating end 40c, there being four such notches in the illustrated embodiment as indicated at 46a,b,c and d. The notches 46a–d are preferably formed integral with the peripheral tine wall 40c and each notch is defined by longitudinal marginal edges, such as indicated at 48a and 48b, and by a transverse marginal edge, such as indicated at 50a. The inwardly formed notches 46a–d define internal core retaining fingers which allow a turf core to readily enter the tine penetrating end 44 and be captured within the tine so as to retain the core during withdrawal or retraction of the tine from the turf surface, thus preventing the turf core from dropping from the tine.

FIGS. 9 and 10 illustrate an additional embodiment of a turf aerating tine, indicated generally at 50, constructed in accordance with the present invention. The tine 50 is also preferably made from a suitable strength metallic tubular material and has a tubular length 50a of generally cylindrical configuration extending from an open discharge end 52a and tapering slightly to a point 50b from which a turf penetrating end portion 50c is formed, including a shoulder portion 50d which is integral with a substantially cylindrical neck portion 50e of slightly narrower diameter than the diameter of the length 50a. The neck portion 50e terminates in a turf penetrating end 54. The end 54 is preferably formed with a sharpened circumferential chamfer or bevel surface 54a.

The shoulder and neck portions 50d and 50e may be formed in the tine 50 by conventional machining or stamping techniques. The resulting core gripping area 56, defined by the interior of the neck portion 50e, is designed to exert greater friction over the entire circumference of the core and for a significant portion of the length thereof. The interior surface 58 of the portion 50a defines a core release area of relatively greater diameter than the gripping area 56. This configuration allows the core held within the tine 50 by the gripping area 56 to be more readily released by the incoming force of a subsequent core through the end 54.

While the turf aerating tines 20, 30, 40 and 50 find particular application in vertically reciprocating tine type turf aerating machines, they may be readily modified to facilitate mounting on a rotary tine wheel for use in rotary type turf aerating machines. The irregular or modified turf penetrating ends of the tines 20, 30, 40 and 50 facilitate retention of turf cores or plugs during retraction of the tines from a turf surface, thereby preventing discharge of the cores from the entry ends of the tines onto the underlying turf or ground surface.

While preferred embodiments of turf aerating tines in accordance with the present invention have been illustrated and described, it will be understood that changes and modifications may be made therein without departing from the invention in its broader aspects. Various features of the invention are defined in the following claims.

What is claimed is:

1. A coring tine for use in a turf aerator machine having a plurality of such tines and designed to automatically cause said tines to undergo substantially longitudinal penetration into and retraction from a turf surface so as to form a pattern of generally cylindrical aeration holes in the turf surface as the machine traverses the surface, said tine comprising, an elongated, generally tubular and slightly tapered body having a discharge end and a turf penetrating end, a portion of said body including said turf penetrating end having a tapered configuration including a tapered shoulder portion and a narrowed neck portion, said neck portion including an interior core gripping surface with a diameter which is narrower than that of any portion of said body and said shoulder and being adapted to frictionally engage and retain a turf core upon longitudinal movement of said penetrating end into a turf surface and retraction therefrom, said neck portion terminating in a sharpened circumferential cutting edge.

2. A coring tine as defined in claim 1 wherein said configured penetrating end extends less than one-half the longitudinal length of the tine.

3. A coring tine as defined in claim 2 wherein said configured penetrating end extends approximately one-fourth the longitudinal length of the tine.

4. A coring tine for use in a turf aerator and the like, said tine comprising, an elongated generally tubular body having a discharge end and a turf penetrating end, a portion of said body including said turf penetrating end having a configuration adapted to frictionally engage and retain a turf core upon longitudinal movement of said penetrating end into a turf surface and retraction therefrom, said core engaging configuration being defined by a longitudinally fluted peripheral wall, a portion of the length of said tine being cylindrical, and wherein said fluted peripheral wall includes a plurality of longitudinal flutes formed progressively radially inwardly from said cylindrical portion toward a terminal penetrating edge of said tine.

* * * * *